Patented Apr. 26, 1949

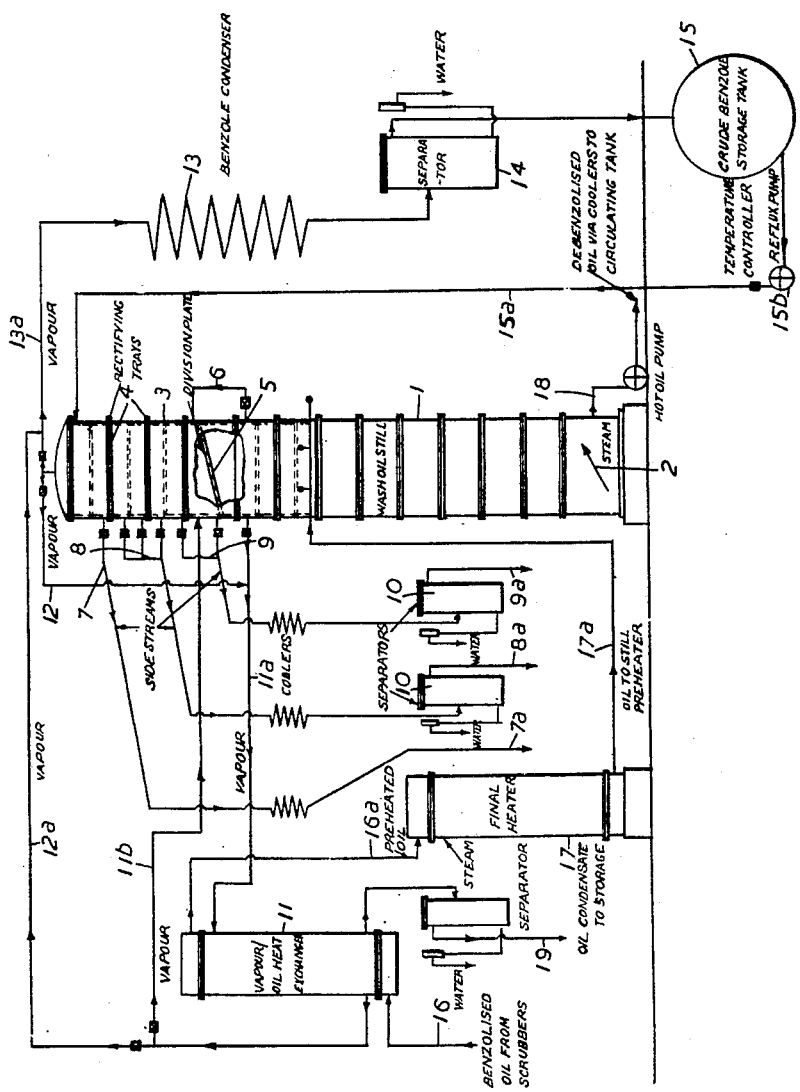

2,468,514

UNITED STATES PATENT OFFICE 2,468,514

APPARATUS FOR THE RECOVERY OF CRUDE BENZOLE FROM BENZOLIZED WASH-OIL

Douglas Rider and William James Chadder, Guildford, England, assignors to Woodall-Duckham (1920) Limited, Guildford, England, a British company Application July 25, 1945, Serial No. 607,000
In Great Britain June 21, 1940

Section 1, Public Law 690, August 8, 1946
Patent expires March 19, 1961

1 Claim. (Cl. 202—159)

This invention relates to improvements in the recovery of crude benzole of enhanced quality from benzolized wash-oil.

The invention is applicable to the known type of wash-oil stripping and crude benzole recovery apparatus which includes a bubble-tray or the like distilling column wherein preheated benzolized wash-oil is distilled by open steam. The benzolized oil, before it is admitted to the distilling column, is preheated in a vapour-to-oil heat exchanger by means of the steam and crude benzole vapours leaving the distilling column, and also by means of indirect steam heating in a final oil preheater. If desired, further preheating may be effected by the hot debenzolized oil in an indirect heat exchanger. The uncondensed vapours leaving the top of the distilling column, after passage through the vapour-to-oil heat exchanger, are condensed in a water-cooled condenser and flow to a water separator.

It is frequently desirable to produce a crude benzole which can be chemically washed without having first to submit the crude benzole to a primary distillation to remove the wash-oil which is usually contained in the crude benzole produced by the method of the preceding paragraph. This desideratum can be achieved in known manner by the employment of a supplementary column which receives the uncondensed benzole and steam vapours leaving the vapour-to-oil heat exchanger. This supplementary column has either a dephlegmator or is served with finished product as reflux liquid, a re-boiling unit is also provided at the base of the supplementary column.

The present invention provides a convenient and efficient apparatus for the rectification of the vapours arising from the steam distillation of benzolized wash-oil, and admits of the production of a crude benzole of improved quality.

According to the present invention, apparatus for effecting the recovery of crude benzole from benzolized wash-oil comprises a wash-oil distilling column of known type, an extension of said column forming a rectifying section for the benzole vapours, which extension contains vapour and reflux liquid contacting means and is mounted directly on but is separated from direct communication with the wash-oil distilling column, a vapour-to-oil heat-exchanger, and a plurality of connections for passing vapours from the top of the wash-oil distilling column either directly into the base of the rectifying section, or first through the vapour-to-oil heat exchanger and thence into the base of the rectifying section.

Further features of the invention will be apparent from the appended claim.

The invention is illustrated in the accompanying drawing, in which 1 is a distilling column of any known type suitable for the distillation of crude benzole from benzolized wash-oil by means of open steam supplied at 2 to the base of the column. On the column 1 is situated an extension 3, containing a plurality of rectifying bubble-trays or plates 4. The number of such trays in the extension may be, for example, six. The distilling column 1 and the extension 3 are separated by a division plate 5, and a by-pass 6 controlled by a valve connects the top of the column 1 to the lower end of the extension 3.

Five of the rectifying trays or plates 4 in the extension 3 have each an offtake for the separate withdrawal of the liquid fractions condensing on the individual trays; the fractions removed may, for example, be naphtha, wash-oil containing naphthalene, and water, and these may be withdrawn from the appropriate plates through branches 7, 8 and 9. The side products are passed through suitable coolers and then through water separators 10 of known type, and are delivered to storage at 7a, 8a and 9a.

A pipe 11a connects the top of the wash-oil distilling column 1 and a vapour-to-oil heat exchanger of the known type 11, and a pipe 11b connects the outlet of the vapour-to-oil heat exchanger 11 and the bottom of the extension 3. A pipe 12 containing a valve permits vapours from the top of the extension 3 to be passed via the pipe 11a through the vapour-to-oil heat exchanger 11, and thence through the pipe 12a to the crude benzole condenser 13. A direct connection 13a is arranged between the top of the extension 3 and the crude benzole condenser 13.

Crude benzole from the condenser 13 passes through the water separator 14 and is received in the crude benzole storage tank 15, from which a proportion is returned as reflux by the reflux pump 15b through the pipe 15a to the top plate or tray of the extension 3 of the distilling column.

The benzolized oil from the benzole scrubbers enters the system at 16 and is first preheated in the vapour-to-oil heat exchanger 11 and then passes through the pipe 16a to the final heater 17, from which it is passed by the pipe 17a into the top of the wash-oil distilling column 1. The debenzolized wash-oil is withdrawn at 18 from the bottom of the wash-oil distilling column and returned to the circuit in known manner.

The apparatus of the present invention permits, on the one hand, the vapours from the top of the wash-oil distilling column to be passed through the by-pass 6 directly into the extension 3, wherein the vapours are rectified in conjunction with the refluxed crude benzole returned to the top of the extension. The effect of the treatment of the vapours in the extension 3 is to produce a final product from which, for example, wash-oil and naphthalene are substantially removed as side streams from the trays or plates of the extension. The crude benzole thus produced can now be submitted to a chemical washing without a preliminary redistillation to remove the wash-oil and other hydrocarbons. Any proportion of the higher homologues of benzole which may not be desired in the product intended for washing can be removed as side streams. The number of trays 4 can be increased if necessary for such purpose.

In the operation of a wash-oil distilling column such as 1, there is normally a surplus amount of heat available therein. The apparatus permits effective use to be made of this surplus heat for the re-boiling of the reflux liquid supplied to the top of the extension 3, with the simultaneous production of a crude benzole of an improved quality.

In certain cases, on the other hand, it may be found that the quantity of open steam used in the wash-oil distilling column 1 is in excess of the maximum amount permissible for good fractionation of the benzole vapours in the extension 3. If this is the case, then by closing the by-pass 6 and opening the appropriate valve in the pipe 11a the vapours from the top of the distilling column 1 can first be passed through the vapour-to-oil heat exchanger 11, to condense part of the steam in the vapours, the condensate from the heat exchanger 11 being removed at 19 through a water separator. The uncondensed vapours with the steam remaining therein are returned through the pipe 11b into the bottom of the extension 3, wherein fractionation of the vapours proceeds as before.

What we claim is:

Apparatus for effecting the recovery of crude benzole from benzolized wash oil including the combination of a wash oil distilling column, a rectifying section for benzole vapors containing vapor and reflux liquid, contacting means mounted on, but separated from direct communication with said wash oil column, a vapor-to-oil heat exchange cooler, connecting means for passing vapor from the top of said column through said vapor-to-oil exchange cooler and thence into the lower part of the rectifying section, a valved connection from the top of said column directly into the lower part of said rectifying section, an alternative connection from the top of said rectifying section to the inlet of said vapor-to-oil heat exchange cooler to cause vapors from the rectifying section to be passed through said vapor-to-oil heat exchange cooler, piping connections arranged to conduct benzolated wash oil through the vapor-to-oil heat exchange cooler to preheat the oil, a temperature control heater, piping connections between the vapor-to-oil exchange cooler, and heater, and between the heater and the column to pass preheated oil into the upper portion of the column, means to withdraw lean oil from the base of the column, a benzole condenser and collector and piping means between the benzole condenser and the vapor-to-oil heat exchanger and between the benzole condenser and the top of the rectifying section by which vapors may be passed through the condenser to the collector.

DOUGLAS RIDER.
WILLIAM JAMES CHADDER.

REFERENCES CITED

The following references are of record in the file of this patent:

UNITED STATES PATENTS

| Number | Name | Date |
|---|---|---|
| 968,833 | Carrol | Aug. 30, 1910 |
| 1,282,324 | Tschudy | Oct. 22, 1918 |
| 1,303,321 | Hudson et al. | May 13, 1919 |
| 1,561,899 | Barbet | Nov. 17, 1925 |
| 1,916,349 | Van Ackeren | July 4, 1933 |
| 1,946,020 | Gorhan | Feb. 6, 1934 |
| 2,146,721 | Conviser | Feb. 14, 1939 |

FOREIGN PATENTS

| Number | Country | Date |
|---|---|---|
| 573,659 | Great Britain | Nov. 30, 1945 |

OTHER REFERENCES

"Light Oil Recovery from Coke Oven Gas," American Gas Journal, vol. 153, No. 3, pages 7-10 and 46.